Patented Apr. 1, 1924.

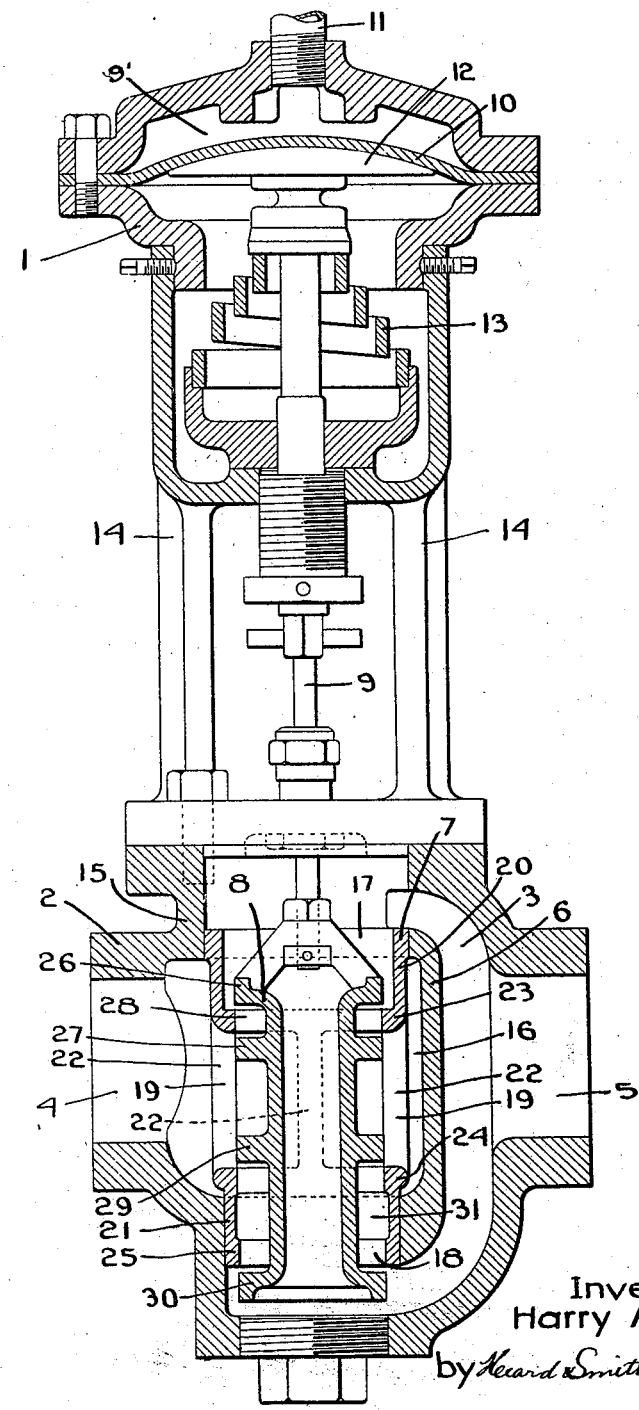

1,488,461

UNITED STATES PATENT OFFICE.

HARRY A. AUSTIN, OF MEDFORD, MASSACHUSETTS.

FLUID-PRESSURE GOVERNOR.

Application filed February 13, 1923. Serial No. 618,860.

*To all whom it may concern:*

Be it known that I, HARRY A. AUSTIN, a citizen of the United States, and resident of Medford, county of Middlesex, State of Massachusetts, have invented an Improvement in Fluid-Pressure Governors, of which the following description, in connection with the accompanying drawing, is a specification, like characters on the drawing representing like parts.

This invention relates to a balanced valve such as is used in systems of fluid conveying pipes in which it is desired to conduct fluid from a high pressure line and maintain a constant, but reduced, pressure in a second line.

One object of the invention is to provide a balanced valve which is very sensitive to unbalancing influences.

A further object of this invention is to provide a balanced valve containing a piston for carrying the valve rings which have telescoping engagement with the valve seats.

A further object of this invention is to provide a balanced valve which will stop the flow of fluid therethrough when the valve is near either limit of its movement.

The single figure composing the drawings shows a sectional view through the valve.

While the valve of the present invention may be used in connection with any system in which fluid is conveyed in pipes and where equal or unequal pressures are maintained on the opposite sides of the valve, it is of particular use in a steam system, as for instance a system where engines are run and a building heated by steam generated in a single boiler in which a high pressure is maintained. In such a case the pressure required in the steam-heating system is usually very much less than that required for operating the engine and the valve herein shown functions as a reducing valve to throttle down the pressure of the steam delivered to the steam-heating system and to maintain the desired low pressure therein.

The valve is designed with the seats and rings having sliding contact with one another and the valve rings having movement transversely of the flow of fluid so that only a low pressure, or a very slight unbalancing, is necessary to operate the valve.

As illustrated herein the structure comprises a balanced valve having a balancing device, denoted generally at 1, and a valve structure 2. The valve structure has a valve chamber 3 with inlet and outlet openings 4 and 5 respectively. A wall 6 is formed in the valve chamber and a sleeve 7 is retained in said wall to form the valve seats with which the valve rings on a piston type of valve 8 co-operate to shut off the flow of fluid through the valve. A rod 9 connects the piston 8 with the balancing device 1 so that the movement of the balancing device will be communicated to the piston.

The balancing device comprises a pressure chamber 9' with a flexible diaphragm 10 of any suitable construction forming a portion of the wall of said chamber. A pipe 11 opens at one end into the pressure chamber 9' and at the other end into the low-pressure side of the steam line and serves as a means by which the diaphragm is subjected to the same pressure as that in the low-pressure side of the steam line. A head 12 engages with the diaphragm and connects with the rod 9 so that when pressure is exerted on the diaphragm and causes downward movement thereof, the movement is transmitted by means of the head to the rod and thence to the piston of the valve. A spring 13 engages the head and acts in opposition to the pressure exerted on the diaphragm. The balancing device is supported in operative position above the valve proper in any convenient manner, as by standards 14.

The valve proper consists of a casing 15 which forms the outer walls of the chamber 3 heretofore mentioned, and the openings 4 and 5 are formed through this casing. The wall 6 projects from the casing 15 forming an inner chamber, 16 within the chamber 3 and the inlet opening 4 from the high pressure line communicates solely with this inner chamber. The sleeve 7 tightly fits at its upper and lower ends against the wall 6 to keep fluid which enters the opening 4 and fills the chamber 16 between the inner wall 6 and the walls of the sleeve from escaping into the chamber 3. The open ends 17 and 18 of the sleeve open into the chamber 3 and thus communicate with the outlet opening 5 in the casing 15. Orifices 19 open through the walls of the sleeve 7 and divide the sleeve into upper and lower portions 20 and 21 respectively connected by webs 22 which are the portions of the walls which remain when the orifices are cut. A single circular valve seat 23 is formed on the upper portion of the sleeve and upper and lower valve seats 24 and 25 respectively are formed on the lower portion of the sleeve. All of these valve seats are preferably of the same diameter and are directly above one another so that the valve piston may slide therethrough.

The valve piston operates in the sleeve 7 and is moved by means of the balancing device and the rod 9 as heretofore mentioned. The piston has two adjacent upper valve rings 26 and 27 respectively with a port 28 between them and the rings are of such a size that when the valve is so unbalanced as to be near either limit of its movement the circumference of the valve rings has telescopic engagement with the valve seat 23 to stop the flow of fluid, but when the valve is in a balanced condition the port 28 is opposite the valve seat 23 to allow fluid to pass through the port and around and through the valve seat and escape through the open end 17 of the sleeve into the chamber 3 and out into the low pressure system.

The piston also has an upper and a lower valve ring, 29 and 30 respectively formed on the lower end thereof which rings are separated such a distance that the upper ring 29 is the same distance above the valve seat 24 that the valve ring 26 is above the valve seat 23 and the lower valve ring 30 is the same distance below the valve seat 25 that the valve ring 27 is below the valve seat 23 in order that when the piston is moved downwardly and is near the lower limit of its movement the upper valve ring on both the upper and lower ends of the piston engage at the same time with valve seats 23 and 24 to stop the flow of fluid through the valve, and when the valve is moved upwardly and is near the upper limit of its movement the lower valve rings on both the upper and lower ends of the piston engage at the same time with the valve seats 23 and 25 to stop the flow of fluid. A port 31 is formed by the valve rings 29 and 30 to permit the passage of fluid from the opening 4 around and through the valve seats 24 and 25 out through the lower end 18 of the sleeve into the chamber 3 and into the low pressure side of the system.

In the type of valve disclosed in the present invention it is to be noted that when the fluid passes through the orifices in the walls of the sleeve and out through the open ends of the sleeve, it passes around and through the valve seats in a direction which is transverse to the movement of the piston and valve rings. Since the valve rings do not operate directly against the direction in which the fluid is flowing, but transversely thereof it is readily seen that very little force is necessary to close the openings of the valve and stop the passage of the fluid. The valve rings have telescopic engagement with the valve seats and when the valve is in closed position it is not necessary that a great amount of pressure be continuously exerted in any direction in order to keep the valve rings and valve seats in the position to stop the flow of fluid.

Having thus described the invention, what is claimed as new, and desired to be secured by Letters Patent, is:

1. A balanced valve for fluids under high pressure having a balancing device and a valve structure comprising a valve chamber with inlet and outlet openings, a sleeve in the valve chamber with its open ends connecting with the outlet openings and orifices through its wall connecting with inlet openings, the orifices dividing the sleeve into upper and lower portions, a single circular valve seat on the upper portion of the sleeve and an upper and a lower valve seat on the lower portion of the sleeve, a valve piston operating in said sleeve and moved by the balancing device, the piston having two adjacent annular projecting valve rings co-operating with and of a size to telescope into the valve seat on the upper portion of the sleeve, and a port between the valve rings, said piston also having two separated annular projecting valve rings co-operating with the upper and lower valve seat on the lower portion of the sleeve and a port between the valve rings, the valve rings and ports being so positioned that when the valve is in balanced condition the ports are opposite the valve seats to permit the passage of fluid and when the valve is so unbalanced as to be near either limit of its movement the valve rings of the piston engage with and move through the valve seats of the sleeve to form a fluid-tight juncture and prevent the passage of fluid.

2. A balanced valve for fluids under high pressure having a pressure chamber, a flexible diaphragm forming a portion of the wall of said chamber, means to admit a fluid under pressure into said chamber, a head engaging said diaphragm, a spring engaging said head and counter-balancing the pressure on the diaphragm, and a valve structure comprising a valve chamber with inlet and outlet openings, a valve seat member in the valve chamber having open ends connecting with the outlet opening, and orifices through its side walls connecting with the inlet openings with valve seats above and below said orifices, and a piston operating in said valve seat member, said piston being connected to the head and movable therewith, and having ports therein and valve rings above and below the ports for engagement with the valve seats, the valve seats being so positioned with regard to the valve rings that when the valve is in balanced position the valve rings do not engage the valve seats, and the passage of fluid through the orifices and ports is permitted, but when the piston moves toward either limit of its movement the valve rings move transversely of the flow of fluid until in their unbalanced position the valve rings telescope into the valve seats to stop the flow of fluid.

In testimony whereof, I have signed my name to this specification.

HARRY A. AUSTIN.